Patented Aug. 17, 1937

2,090,511

UNITED STATES PATENT OFFICE 2,090,511

COLLOIDIZED VAT DYE

Moses L. Crossley, Plainfield, Roy H. Kienle, Bound Brook, and George L. Royer, Somerville, N. J., assignors to The Calco Chemical Company, Inc., Bound Brook, N. J., a corporation of Delaware

REISSUED MAR 19 1940

No Drawing. Application April 18, 1935, Serial No. 17,130

14 Claims. (Cl. 8—6)

This invention relates to new highly dispersible vat dye powders. Vat dyes are used both for the dyeing of textiles from a dye bath and also particularly for the printing of textiles and other materials using a printing gum or paste. Other uses of vat dyes are for coloring of plastics, paper and other material. It has been the practice in the past to use vat dyes primarily in the form of pastes and pastes having a reasonably high dispersibility are known. However, there are many disadvantages in the use of pastes and the tendency in recent years has been to develop powders having the advantages that the dye is in concentrated form and therefore when shipped there is no freight to be paid on water and also there is no tendency to freeze or to change characteristics on storage which renders pastes undesirable. Dye powders also permit a very accurate mixing of colors by the dyer, because there is no change in the concentration of the dye due to alterations in the composition of the pastes on standing.

The production of vat dye powders, however, has raised several problems. In the first place most of the powders have not been as rapidly dispersible as the pastes, that is to say when placed in water they have not shown the properties of almost instantaneous dispersion analogous to a soluble solid. An even more serious drawback has been the fact that the dye particles have tended to agglomerate, which results in a product of low tinctorial power, because of course the coloring effect of an insoluble pigment is of a surface character, that is to say when a number of particles of pigment are agglomerated into a larger agglomerate the particles in the interior of the agglomerate do not have any effect in coloring the products in which the dye is used. This low tinctorial power therefore requires the use of a large amount of dye and what is even more serious, the intensity of the shade obtained even with a larger amount of dye is not as great and the tone is not as brilliant as when the dye particles are completely dispersed into minute colloidal particles of the order of size of only a few microns at most.

The agglomeration of dye powders not only adversely affects the tinctorial power, but it also tends to produce spotting or marbled effects, particularly in printing, which are, of course highly undesirable. Another drawback is encountered in printing. When textiles are printed, the dye powder is incorporated into a suitable printing gum or printing thickening as it is sometimes referred to in the trade, and this paste material is then applied to the printing rollers and is printed on to the textiles. The printing paste always contains in addition to the materials giving it the necessary thickness and adhesiveness, a reducing agent such as a hydrosulfite. At ordinary temperatures of course the hydrosulfite will not reduce the vat dye particles in the printing gum, but at elevated temperatures this action begins to take place. Therefore after a piece of textile goods has been printed, it is subjected to heat, usually by means of steam in a so-called ager. The high temperature and moist atmosphere cause the hydrosulfite in the printing gum to reduce a portion of the vat dye to the leuco form and this leuco form then is capable of attaching itself to the fiber or rather being adsorbed therein, so that when the goods are removed from the ager and subjected to oxidation, usually by air, the portion of the dye which has been reduced to the leuco form and which has been adsorbed on the fiber is transformed again into the insoluble colored dye, in which form it can no longer be removed from the fiber by washing. After oxidizing the dye on the fiber, the printing gum is washed off, carrying with it, of course, all of the dye which was not adsorbed into the fiber. The printing process from the standpoint of dye utilization is very inefficient. Normally only a moderate percentage of the dye is actually fastened on to the fiber. The remainder constitutes waste which is disadvantageous from two standpoints. First, the dye which is not actually applied to the fiber is wasted and, secondly, unless a fairly high percentage of the dye prints on to the fiber it is not possible to obtain strong deep shades. Also, unless the dye is to a large percentage reduced and adsorbed on to the fiber, large variations in the amount of dye affixed to the fiber may easily take place, which will result in goods of uneven shade and frequently of spotty or marbled appearance.

The particle size of the dye in the printing gum, that is to say its dispersion in the gum, is the most important factor involved. The finer the particle size, the greater the surface which it exposes to the gum and therefore to the hydrosulfite in the gum, so that a larger percentage of the dye is reduced by the hydrosulfite. Again the reduced dye particles are in a more perfect state of subdivision or dispersion and therefore are more readily adsorbed into the fiber, which means that a larger percentage of the reduced dye is actually adsorbed into the fiber. A third advantage of fine dispersion is the uniformity of shade which is obtained. Where large agglomerates are present which are only partly reduced by the hydrosulfite and the reduced portion of which is only partially adsorbed on the fiber, spots or poor shades are present, giving a mottled effect in the final goods. Of course the larger the amount of dye adsorbed on the fiber where the dispersion is very fine results in a higher tinctorial power and therefore deeper and more brilliant shades.

While smaller dye particles give greater tinctorial strength, there is a limit to particle size and if the particles are made too small they will tend to penetrate too deeply into the fabric which will result in the color appearing on the wrong side of the goods. Sometimes this effect is so marked that the wrong side will show an even more intense color than the right side. Penetration into the goods is also affected by the time of aging and in general the shorter the period of aging which will give a given strength of print, the better, as this not only increases the output capacity of the agers, but also prevents too deep penetration of the dye into the fabric. The present invention permits obtaining a print of the desired strength with a considerably shortened aging time and this is of marked importance.

The powders which have been produced in the prior art show varying degrees of autodispersibility, that is speaking of dispersion in water, and they have all hitherto shown a relatively unsatisfactory total dispersion and particle size, particularly in printing gums. Up to the time of the present invention no powder even approached a good, freshly prepared paste in tinctorial power, evenness of shade and efficiency in utilization of the dye. Moreover, the powders of the prior art, especially those which show satisfactory autodispersibility are also open to the very serious disadvantage that they are highly hygroscopic and therefore if exposed to the atmosphere they tend to adsorb moisture and, of course, the advantage of a powder is then lost. Excess hygroscopicity also tends to cause the dye to blend in printing which results in blurred lines. This advantage is very marked in certain dye powders now on the market where in order to obtain high dispersibility apparently a relatively large amount of very hygroscopic dispersing agents are used. These dye powders, while capable of reasonably rapid aging, will not give sharp prints. It is a marked advantage of the present invention that high dispersibility is obtained without sacrificing sharpness of printing. The present invention produces pastes and particularly powders of higher dispersibility and much improved tinctorial power. Moreover, the powders of the present invention show no loss in tinctorial power, autodispersibility or total dispersibility when compared with the corresponding pastes.

The products of the present invention are obtained by deflocculating the dye in the form of a thin paste in a dough mixer which may be of any suitable type capable of handling stiff pastes, such as for example the Werner and Pfleiderer or Day kneading machines or a Banbury mixer, the paste being sufficiently thick and stiff so that it exerts a shearing action on the dye particles, producing a perfect colloidal dispersion or deflocculation and also preferably coating the particles with a thin film of a protective agent sufficiently elastic so that it does not crack off on drying. The deflocculated paste which may preferably contain the protective agents and, if desired, wetting agents, is then carefully dried at a low temperature and can then be pulverized, producing a powder in which the individual particles are coated with protective agent and do not agglomerate and disperse either in water or in a printing gum, completely and perfectly giving a dispersion as perfect as obtainable in the very best dye pastes made in the prior art when freshly prepared.

The pastes of the present invention are superior to the pastes which have been made in the past. They have as perfect a dispersion as was ever obtained in a freshly made paste and this perfection of dispersion is not lost on standing. Of course the pastes share certain of the disadvantages common to all pastes, namely, the tendency to freeze in cold weather, the difficulty of shipping and the liability to fermentation on standing where fermentable protective agents or diluting agents are present. They do not, however, possess the disadvantages which are inherent in the pastes produced hitherto, namely, the poor keeping qualities and the effect on printing gums. Contrary to the pastes of the prior art, the pastes of the present invention do not settle on standing. They do not gel or liver and they do not unduly increase the viscosity of the printing gum or thickening, nor do they have a tendency which is undesirable in some prior art products of first lowering the viscosity of printing gum and then on standing raising the viscosity.

It is, of course, important that the viscosity of printing gum remain constant as the whole mechanism of printing machinery depends on a uniform printing paste. The powdered products of the present invention differ from those of the prior art, first in that they show perfect total dispersion, that is to say there is no difference in the dispersion or particle size of the powder when used over that obtained from the best pastes, so that all of the advantages of a powder are obtained without any disadvantages which have been inherent in vat dye powders in the past. A second characteristic of the powders is that they have a very high autodispersibility and this high autodispersibility is obtained without increasing the hygroscopicity of the powder. The high autodispersibility aids in cutting down the time of aging and this advantage is obtained without the use of excessive amounts of hygroscopic dispersing agents which will result in producing prints with blurred outlines. In more specific embodiments of the invention where antidusting agents are employed, the quality of non-dusting is likewise a characteristic of the vat dye powders of the present invention.

The above characteristics of the products of the present invention render them superior to the known products of the prior art both from the standpoint of their use in vat dyeing and in their use in printing. Some of the characteristics are of advantage both in dyeing and in printing. Other characteristics are of particular importance only in printing and it is in this use that the products of the present invention show the most marked advantages. It should be understood, however, that the present invention is in no sense limited, at least in its broader aspects, to the use of the vat dye products for printing, although in more specific embodiments printing compositions embodying the products of the present invention are claimed.

It is an advantage of the present invention that known deflocculating, protective, diluting and wetting agents may be used and it has been found that certain of these agents are of special advantage. Some typical agents which may be used are as follows:

Deflocculating agents

Dextrine is an example of a commercial deflocculating agent. Various types of dextrin, including yellow dextrin may be used and they have the advantage over such deflocculating agents as tannic acid that they are also good protecting agents. A number of other carbohydrate colloids are also suitable. A second and preferred class of deflocculating agents are the synthetic tanning aids of the sulfonated diarylmethane type. The most common member is the sodium salt of disulfodinaphthylmethane. This deflocculating agent has a further advantage that it is also a wetting agent.

Protective agents

These agents are primarily colloidal materials which form films around the minute pigment particles which films are sufficiently elastic so that they do not crack off on drying and are preferably soluble in water, or at least take up water to swell. The commercially most attractive class of protecting agents are the carbohydrate colloids such as the dextrins. These agents give very satisfactory films, they are cheap and do not introduce into the pigment any components which would be harmful in the products which are to be colored by the pigment. Another typical protective agent is the alkali salt of lignin sulfonic acids which are obtained from the waste liquor of the sulfite process of producing wood pulp. While the above two classes of protective agents are the preferred examples, the invention includes the use of any other protective agent for example, gelatin, albumens, alkali, metal silicates, pectin, colloidal clays, etc., capable of forming a satisfactory film around the individual pigment particles.

Diluting agents

The preferred diluting agents are mainly carbohydrates such as sugar, dextrose, cerelose, xylose and the like. In fact, any of the common soluble carbohydrates are suitable. Other common diluting agents such as salts may also be used in certain cases. It is an advantage of the present invention that it is applicable to pigment pastes and dry powders containing the standard diluents used in the art. The invention is, however, not concerned with the use of any specific diluent and where a pigment in undiluted form is desired, the diluent may of course be eliminated. Cerelose is particularly desirable as it permits producing a product of very low hygroscopicity.

Wetting agents

Any of the usual wetting agents can be used which are suitable for the particular conditions of alkalinity or acidity in the coloring process in which the pigment is to be used. The alkylnaphthalene sulfonates are among the best pure wetting agents and the readily commercially available products such as sodium isopropylnaphthalene sulfonate and sodium second arybutylnaphthalene sulfonate constitute preferred members. The synthetic tanning agents of the disulfodiaryl methane type such as disulfodinaphthylmethane, are also very effective and have the additional desirable feature as referred to above under deflocculating agents, of serving as combined wetting and deflocculating agents. The alkali and alkaline earth metal salts of lignin sulfonic acids form another class of wetting agents which have the additional advantage of being at the same time protecting agents. Sodium salts of sulfonate lauryl, cetyl and similar high molecular alcohols, are also excellent wetting agents and may be used to advantage in the present invention. Another class of wetting agents are the ethers of polyglycols such as, for example, the ethyl ether of diethylene glycol. These wetting agents are also anti-dusting agents.

Examples of other compounds which are both wetting agents and anti-dusting agents are certain esters of ethers of simple polyhydric alcohols such as, for example, the acetates of the methyl, ethyl or butyl ether of ethylene glycol. These esters are in general combined anti-dusting and wetting agents when they are partially miscible with water.

The above enumeration of a few classes of wetting agents is not intended as limiting the invention to these products. They are typical of some of the well known wetting agents which have proven highly successful in the present invention and which are preferred, but any other wetting agent which does not introduce undesirable components into the final product may be employed.

Antidusting agents

These agents are mostly hygroscopic and tend to absorb sufficient water from the atmosphere to prevent the finely ground pigment from dusting. The earliest antidusting agent used was glycerine and this is effective. However, where a pure antidusting action is desired, the esters of ether alcohols with low molecular organic acids are preferred. Thus, for example, the acetates or formates of the ethyl, methyl or butyl ethers of ethylene glycol are antidusting agents of the highest efficiency. Similar esters of other ether alcohols and other low molecular organic acids may be used. The ethers are condensed polyhydric alcohols such as the ethyl ether of diethylene glycol, are also very effective and have the additional advantage that they are also wetting agents.

It might appear that the use of an antidusting agent which operates by reason of its hygroscopic properties, would result in producing a very hygroscopic pigment power and would therefore defeat one of the main advantages of the present invention. However, the antidusting agents are present in such small quantities that although they prevent dusting by reason of their high hygroscopicity, they form so minute a fraction of the pigment powder that they do not materially increase the hygroscopicity of the pigment as a whole.

Printing aids

It is common to use printing aids in printing gums. These are materials which appear to make for better prints. The exact way in which they improve the results is not entirely understood. When pastes are used liquid printing aids are employed such as alkylol amines, for example triethanol amines, glycerine, ethers of ethylene glycol and polyglycols and their derivatives, glycol, diethylene glycol, etc. Where powders are employed, solid printing aids are necessary and examples of such solids are the hydrochlorides of alkylol amines, such as triethanol amine; silver salt; (sodium anthraquinone betasulfonate); anthraquinone and oxalates of metals such as cobalt or iron. The present invention permits using a considerably smaller amount of printing aids; for example, up to 5% give satisfactory results.

Vat dyes

The vat dyes which can be used in the present invention include all of the insoluble dyes capable of dyeing by reduction to the luco compound and subsequent reoxidation. The following are a few typical classes of vat dyes which may be employed in the present invention, but it should be understood that it is not limited thereto. The abbreviation C. I. refers to the Color Index.

A. Anthraquinone vat dyes:
1. Anthraflavones;
   Example under this class would be Anthraflavone G., C. I. 1095.
2. Pyranthrones;
   Example: Indanthrene Golden Orange G., C. I. 1096.
3. Dibenzanthrones and Isodibenzanthrones;
   Example: Dark Blue BO, C. I. 1099; Vat Black BB, C. I. 1102; Jade Green, no C. I. number; Indanthrene Violet 2R, C. I. 1104; Vat Navy Blue, no C. I. number.
4. Anthraquinone Azines;
   Example: Indanthrene Blue GCD, C. I. 1113; Indanthrene Blue BGS, C. I. 1114.
5. Flavanthrones;
   Example: Indanthrene Yellow G., C. I. 1118.
6. Benzoyl Amino Anthraquinones;
   Example: Algol Red 2B, C. I. 1133.
7. Di-anthraquinonylamines and ureas;
   Example: Algol Orange R, C. I. 1137; Algol Yellow 3G, C. I. 1139.
8. Anthrapyridones;
   Example: Indanthrene Orange RT, C. I. 1157.
9. Anthraquinone Acridones;
   Example: Indanthrene Violet RRN, C. I. 1161.
10. Anthraquinone Thioxanthones;
    Example: Indanthrene Yellow GN, C. I. 1165.
11. Anthraquinone Sulfur Dyes of unknown constitution;
    Example: Vat Yellow 5G.

B. Indigoids and Thioindigoids:
1. Indigo, C. I. 1177.
2. Ciba Blue B, C. I. 1183
3. Hydrone Pink, C. I. 1211, in which the bromine atoms are replaced by chlorine.
4. Hydrone Orange, C. I. 1217.
5. Hydrone Scarlet—a mixture of pink and orange.

While the advantages of the present invention are preeminent in uses of vat dyes, particularly vat dye powders where the dye is reduced and reoxidized as in vat dyeing or printing, it should be understood that the new products may also be used as pigments, that is to say without reducing and reoxidizing. These uses are largely in coloring of materials where adsorption of the leuco compound cannot or does not need to take place, for example, the coloring of plastics, some processes of coloring paper, and the like, which employ the vat dyes as ordinary pigments, just as for example inorganic pigments are used. For such purposes the high total dispersion and autodispersibility coupled with the low hygroscopicity of the powders of the present invention are just as real advantages as in the processes where the dye is first reduced and then reoxidized. Also, the enhanced keeping powers of the pastes of the present invention are equally useful in processes where the dye is not reduced and reoxidized. It should be noted, however, that the practically perfect colloidal dispersion of the products of the present invention are of even greater importance in processes where reduction and reoxidation take place, because the fineness of dispersion is effective in two factors in such processes, namely completeness of reduction and completeness of adsorption of the reduced material, so that whereas fair results may be obtained with some of the best products of the prior art when used as pigments, the improved results obtainable from the products of the present invention are more strongly marked in processes which involve reduction and reoxidation. The higher tinctorial power of the perfect colloidal dispersion of the products of the present invention is of course equally important in all processes employing the coloring matter.

The invention will be described in greater detail in connection with the following specific examples which illustrate typical products of the present invention. It should be understood, of course, that the invention is not broadly limited to the specific details set forth in the examples which are intended only to be typical representatives of products which can be made within the scope of the present invention.

Example 1

1500 parts by weight of Hydron Orange (C. I. 1217) press cake containing 420 parts of real dyestuff are introduced into a steam jacketed Werner-Pfleiderer mixer together with 10 parts by weight of sodium isopropylnaphthalene sulfonate. After mixing thoroughly a thin slurry forms to which 600 parts by weight of yellow dextrine are slowly added. The entire mixture is worked until uniform and free from lumps whence steam is introduced into the jacket and the mixer heated to evaporate the major portion of the water. The entire mass is then cooled and the thick plastic magma kneaded for six hours, a temperature rise being observed in the magma. At the end of this working, the magma is poured into aluminum or enamelled trays and dried in a vacuum oven at a temperature of approximately 65° C. After drying the mixture is ground to a coarse powder which is placed in a ball mill or other suitable blender and for every 100 parts thereof, there is added 135 parts of Cerelose, 4.9 parts of triethanolamine hydrochloride, 4.9 parts of anthraquinone sodium sulfonate, 2.5 parts of the monoethyl ether of diethylene glycol, and 0.2 part of beta naphthol. When this has been thoroughly blended a homogeneous orange powder results which possesses a hygroscopicity less than 25%, has an autodispersibility over 85%, is stable, and readily disperses in such media as printing gum solutions coloring them intensely reddish orange.

Example 2

510 parts of Hydron Orange (C. I. 1217) press cake are placed in a Warner-Pfleiderer dough mixer and 3.5 parts of the sodium salt of disulfodinaphthylmethane added, followed by 207 parts of yellow dextrine. A thin slurry results which is worked for about six hours, then poured into enamel pans and dried, preferably in a vacuum drier, although a low temperature air oven will suffice. The dried cake is roughly ground and returned to the mixer, adding at the same time from 20 to 25 percent by weight of water. A thick plastic magma results which is worked for 4 to 8 hours, poured into enamelled trays, and vacuum dried at a temperature approximately 65° C. The dried magma is ground to a powder, then transferred to a ball mill or any other suitable blender. For every 250 parts of the concentrated pulverized color added to the ball mill, there is also added 83 parts of cerelose and 3.4 parts of the monethyl ether of diethylene glycol. After a homogeneous mixture has been produced, an orange powder results which is stable, of low hygroscopicity and which readily disperses in aqueous media.

Example 3

434 parts of Hydron Orange press cake containing 132 parts of real dyestuff and 3.5 parts of sodium isopropylnaphthalene sulfonate are placed in a Day dough-mixer together with 175 parts of the sodium salt of the lignin sulfonic acids obtained from the waste liquors of spruce pulp manufacture. A thin slurry results which is worked for about 6 hours, then poured into trays and dried either in a low temperature air or vacuum oven. After drying, the mixture is ground and returned to the mixer. Approximately 25 percent of water is added to form a thick plastic magma which is worked for about six hours. The thick magma is poured into trays and dried in a vacuum oven at 65° C., then ground. The resulting powder is placed in a ball mill and blended with cerelose and the ethyl ether of diethylene glycol as in Example 2. The product is a powder of low hygroscopicity, high autodispersibility, which in moderate additions produces little effect on the consistency of the aqueous media to which it is added.

Example 4

1500 parts of Hydron Orange press cake, containing 325 parts of real dyestuff, are added to a Werner-Pfleiderer mixer along with 15 parts of sodium isopropylnaphthalene sulfonate and 465 parts of dextrine and worked until a smooth homogeneous slurry results. This slurry is placed in trays, dried in a vacuum oven, and ground to a powder. This powder is again placed in the mixer, along with 22 to 28 percent of water, and the plastic mass resulting, kneaded for 6 hours. It is then transferred to enamelled trays and vacuum dried at about 65° C. After grinding, a powder results which, when all thereof is placed in a ball mill with 1490 parts of water and 2.5 parts of betanaphthol and milled a short time until homogeneous, yields a paste wherein the dyestuff is so well dispersed that little or no settling is obtained even after standing for six months.

Example 5

1500 parts of a Hydron Pink (C. I. 1211) press cake, containing 420 parts of real dyestuff, 15 parts of sodium isopropylnaphthalene sulfonate, and 600 parts of dextrine are placed in a Werner-Pfleiderer mixer and kneaded for about 10 hours. The resulting thin slurry is poured into suitable pans and dried at a moderate temperature, for example, 70° C. The ground, dried product is then again added to the dough mixer along with about 25 percent of water and kneaded as a thick plastic for 8 hours. The thick plastic is transferred to suitable trays and dried in a vacuum oven at 65° C. The dried material is then ground to any desired particle size either uses as is or blended in a blender with diluting, wetting, and other agents as desired. By taking 150 parts of the dried concentrated powder and blending with 250 parts of cerelose, 0.4 part of betanaphthol, 4.0 parts of the ethyl ester of diethylene glycol, a pink powder results which possesses low hygroscopicity, is very stable, readily and effectively disperses without specks in a printing gum to yield a paste excellently adapted to printing textiles.

Example 6

700 parts of tetrabromindigo, 100 percent powder is placed in a Warner-Pfleiderer mixer along with 17 parts of disodium dinaphthyl methane sulfonate, 1000 parts of dextrine, and 400 parts of water. The thick plastic mass resulting is kneaded for 10 hours, poured into trays, vacuum dried at 65° C., ground, and reintroduced into the mixer. 25 percent of water is added to produce the desired plastic condition for the second working which requires 6 hours. The smooth plastic mass formed is transferred to trays and vacuum dried at about 65° C. The dried material is pulverized and dry blended in a ball mill or other suitable blending tool with 119 parts of cerelose and 18 parts of the monoethyl ether of diethylene glycol. A powder of low hygroscopicity and high autodispersibility results which, when added to aqueous media, disperses therein coloring the media blue.

Example 7

700 parts of Vat Blue Green FFB 100% powder (C. I. 1173) is dissolved in 8400 parts of 94% sulfuric acid by slow addition and vigorous stirring. This rather thin paste is then poured very slowly into approximately 10,000 parts of water in order to precipitate the dyestuff, stirring vigorously during precipitation. The resulting precipitate is filtered by suitable means, washed free from acid to yield a filter cake of approximately 25 percent solids. This filter cake is placed in a dough mixer, 17 parts of disodium dinaphthyl methane sulfonate and 1000 parts of dextrine added, and then converted into a dried concentrated powder as described in Example 5. 300 parts of the resulting dried concentrated powder, 75 parts of cerelose, and 17 parts of triethanolamine hydrochloride are then placed in a ball mill and blended together to produce a homogeneous mixture. This final mixed powder possesses low hygroscopicity and high dispersive properties.

Example 8

700 parts of Indigo (C. I. 1177) 100% powder, 17 parts of sodium isopropyl naphthalene sulfonate, 1000 parts yellow dextrine, and 400 parts of water are placed in a Werner-Pfleiderer mixer and kneaded as a thick plastic for 10 hours. The smooth plastic produced is poured into aluminum trays and vacuum dried at 65–70° C. The dry material is ground and when 150 parts thereof are blended, in a suitable blender, with 150 parts of xylose and 3 parts of sodium secondary butyl naphthalene sulfonate, a powder results which so readily disperses in water that it would appear as if the powder were going into solution. Such solutions have merit as vat dyeing baths.

Example 9

Place 25 parts of water in a Werner-Pfleiderer mixer, add slowly 100 parts of di nitro dibenzanthrone (Indanthrene Black BB), then add 25 parts additional water followed by 100 parts of dextrine. As soon as thorough mixing is obtained repeat the addition of the water and of the dextrine until a total of 300 parts of dextrine has been worked into the mass. Add 50 parts of colloidal clay in water suspension. Mix thoroughly and then add sufficient dextrine to give a mixture of dough consistency. At this consistency continue kneading until the plastic mass is smooth and free from lumps. Add water and mix thoroughly until the paste is thin enough to remove from the mixer. Transfer the paste to pans and vacuum dry. When dry, transfer to a grinder and grind until reduced to a fine powder. This powder is stable, disperses readily in water, and is useful for vat dyeing purposes or similar applications.

*Example 10*

Place 1100 parts of Indanthrene Blue BCS (C. I. 1114) paste, containing 440 parts real dyestuff; and 620 parts of dextrine in a Werner-Pfleiderer mixture and work for 4 hours. Transfer the thin slurry to pans and dry either in a vacuum or air oven. After rough grinding the dried product, place the same again in the mixer and add enough water to produce a thick plastic magma. Knead this magma for about 4 hours, pour into trays and vacuum dry at 60–70° C. Grind to a powder and add thereto, by dry blending, sodium secondary butyl naphthalene sulfonate in the proportions of 200 parts to 10 parts respectively. The resulting powder, when added to printing gum, disperses therein producing little change in the consistency and showing no speckiness.

*Example 11*

Place 1400 parts of Vat Yellow GC (C. I. 1118), containing 466 parts of real dyestuff, and 650 parts of yellow dextrine in a Werner-Pfleiderer dough mixer and work for 6 hours. Transfer the rather thin slurry to enamel trays and dry either in an air or vacuum oven. After grinding, the material is returned to the dough mixer along with about 25 percent water and the resulting plastic mass kneaded for 6 hours. The thick mixture is then poured into trays and dried in a vacuum oven at 65° C. Grind the vacuum dried material and add thereto, by dry blending in a suitable tool, 10 parts of triethanolamine hydrochloride to every 100 parts of the powder. The final powder is very useful for vat dyeing and printing purposes.

*Autodispersibility tests*

The power of dispersing in water practically instantaneously is of importance in obtaining readily uniform dispersions without excessive stirring. This is particularly of importance where the products are to be employed as pigments, and is of lesser importance in such uses as the preparation of printing gums where the production of the gum necessary involves thorough steaming. Autodispersibility is measured by a simple test in general use by the Calco Chemical Company. A closely woven cotton cloth such as is used in laundry bleaching or bluing bags is cut into four inch squares and a square fastened over the mouth of an eight ounce bottle, being held by an elastic. One gram of the powder to be tested is placed on the cloth and 25 cc. of water is caused to flow over it from a pipette at a rate such that it takes approximately 80 seconds for the 25 cc. to flow through. The amount of powder remaining on the cloth and passing through into the bottle is weighed and the percentage passing through is termed the percentage of autodispersibility. This test is a practical one and really measures speed and completeness of dispersion as an extremely soluble solid will show approximately 100% autodispersibility. All the vat powders prepared according to the present invention will show autodispersibility of approximately 90%, the test being usually accurate to within 2% and the error never exceeding 5%. It has been shown in practice that no distinction in effectiveness can be noted between a material having 90% autodispersibility and one having 100%. However, when the autodispersibility drops below 75%, the product is distinctly inferior.

*Hygroscopicity*

Certain vat powders have appeared on the market since the development of the present invention showing a high autodispersibility. For example, certain competing vat orange powders show autodispersibility ranging from 30 to 85%. These high autodispersibilities, however, are obtained at the expense of hygroscopicity for these products are highly hygroscopic and cannot be kept for any length of time exposed to the atmosphere. It has been found that a reliable test for hygroscopicity is obtained by exposing the powder in a desiccator at room temperature to an atmosphere having 84.7% humidity, which is maintained by a saturated aqueous solution of potassium chloride in the desiccator. The amount of moisture absorbed by a product of low hygroscopicity increases fairly rapidly in the first two days and then increases very slowly, reaching a practically complete equilibrium in a week. With more hygroscopic material the absorption continues fairly rapidly during the whole of the week. For practical purposes one week's exposure gives a very definite index of hygroscopicity. The products of the present invention all have hygroscopicities well below 25% as measured by the above tests and usually range from 18 to 20%, depending to some extent on the nature of the diluting agent or protective agent used. Thus products made with a preferred diluting agent, cerelose (dextrose monohydrate), show unusually low hygroscopicities. The vat orange powders available in the trade at the present time have autodispersibilities of from 30 to 85%, showing hygroscopicities of approximately 40%. They are therefore valueless unless stored in absolutely airtight containers at all times. For practical purposes a product having more than 25% hygroscopicity can be stored exposed to the atmosphere without serious caking, or even in some extreme cases reverting to a kind of soupy paste. It is one of the outstanding advantages of the present invention that the products despite their enormously high dispersion and high autodispersibility are of very low hygroscopicity and can be used without special precautions in storing. The low hygroscopicity of the products of the present invention is also desirable in producing sharp prints.

*Viscosity changes in printing gum*

Another characteristic of the products of the present invention is that they do not result in wide fluctuations in the viscosity of printing gum and particularly thickening the gum. There is a tendency whenever vat dyes, particularly pastes, and the powder is frequently made up into a paste before incorporation with a gum, to thin out the printing gum temporarily, probably by reason of the additional water present. Many products of the prior art, however, have the serious disadvantage that after standing for a while the viscosity of the printing gum which is at first reduced increases rapidly and greatly exceeds that of the printing gum itself. A small fluctuation does not have serious effects and all of the products of the present invention show an effect on printing gum viscosity which is so small as not to interfere with full efficiency of the printing process. The products of the present invention will result in a viscosity change of not more than 6-10%. Normally, the viscosity is reduced and then comes back to approximately its original value. Products having a viscosity change of greater than 15% are normally undesirable as it is impossible for the printer to rely on his consistency and obtain uniform prints.

Some of the prior art products are very serious offenders in this respect, for example, pigment powders have been described in the patent to Bishop and Thompson, No. 1,659,131. These powders are prepared by dispersing in a foam of soap or other dispersing agent and then drying and grinding the foam. Pigment powders produced by following the teachings of this patent show very markedly inferior total dispersion to those of the present invention and they exert a very serious effect on the viscosity of printing gum. The fluctuation is so great that the printing gum could not be used with ordinary machinery without constant adjustment. The products of the present invention on the other hand enjoy all the advantages of practically perfect colloidal dispersion with its high tinctorial power and efficiency in printing without exerting any deleterious effect on the viscosity of printing gum and it is a peculiar advantage of the present invention that the desirable features of its products are obtained without corresponding disadvantages which so frequently necessitate a compromise in qualities of coloring matter which have been produced hitherto.

In the claims the term "protective agent" is used to define the class of compounds having the physical properties of forming adherent films which are soluble or swell with water, which properties are possessed by the typical materials recited in the specification under the heading "Protective agents". It should be understood that the phrase, as used in the claims, has no other meaning.

We claim:

1. A dispersible vat dye powder having as its major coloring component a vat dye, a sufficient proportion of the individual vat dye particles being individually coated with a hydrophilic auto-dispersibility producing "protective agent" in an amount sufficient so that the powder as a whole possesses an "autodispersibility" of not less than 75% and is capable of complete colloidal dispersion in aqueous media or in printing gum, the completeness of said dispersion equalling that of a dispersion of a freshly prepared paste of the same vat dye.

2. A dispersible vat dye powder having as its major coloring component a vat dye, a sufficient proportion of the individual vat dye particles being individually coated with a hydrophilic auto-dispersibility producing "protective agent" in an amount sufficient so that the powder as a whole possesses an "autodispersibility" of not less than 85 to 90% and is capable of complete colloidal dispersion in aqueous media or in printing gum, the completeness of said dispersion equalling that of a dispersion of a freshly prepared paste of the same vat dye.

3. A dispersible vat dye powder having as its major coloring component a vat dye, a sufficient proportion of the individual vat dye particles being individually coated with a hydrophilic auto-dispersibility producing "protective agent" in an amount sufficient so that the powder as a whole possesses an "autodispersibility" of not less than 75% and is capable of complete colloidal dispersion in aqueous media or in printing gum, the completeness of said dispersion equalling that of a dispersion of a freshly prepared paste of the same vat dye, the product also possessing a hygroscopicity of less than 25%.

4. A dispersible vat dye powder having as its major coloring component a vat dye, a sufficient proportion of the individual vat dye particles being individually coated with a hydrophilic auto-dispersibility producing "protective agent" in an amount sufficient so that the powder as a whole possesses an "autodispersibility" of not less than 85 to 90% and is capable of complete colloidal dispersion in aqueous media or in printing gum, the completeness of said dispersion equalling that of a dispersion of a freshly prepared paste of the same vat dye, the product also possessing a hygroscopicity of less than 25%.

5. A product according to claim 1 in which the "protective agent" is dextrin.

6. A product according to claim 2 in which the "protective agent" is dextrin.

7. A product according to claim 3 in which the "protective agent" is dextrin.

8. A product according to claim 4 in which the "protective agent" is dextrin.

9. A paste having as its major component a vat dye, a sufficient proportion of the individual particles of the vat dye being individually coated with a hydrophilic auto-dispersibility producing "protective agent" so that the paste possesses substantially perfect total dispersibility and does not settle or liver on standing.

10. A method of producing a dye paste which comprises deflocculating a vat dye powder in the presence of a hydrophilic auto-dispersibility producing "protective agent" by kneading the product in the form of a paste sufficiently stiff to exert a shearing action on the dye particle aggregates and continuing the kneading for a sufficient period of time to coat a sufficient proportion of the individual dye particles with an adherent coating of the "protective agent" so that the paste possesses a substantially perfect total dispersibility and does not settle or liver on standing.

11. A method according to claim 10 in which the deflocculation takes place in the presence of a combined deflocculating and wetting agent of the sulfonated diarylmethane type.

12. A method of producing a vat dye powder which comprises deflocculating a vat dye in the presence of a hydrophilic auto-dispersibility producing "protective agent" by kneading in the form of a paste sufficiently stiff to exert a shearing action on the individual dye particle aggregates, continuing the kneading until a sufficient proportion of the individual dye particles are coated with an adherent coating of the "protective agent" so that on drying the paste at a temperature below that at which the coating of the "protective agent" separates from the dye particles, and transforming the dried material into a powder, the resulting powder had an "autodispersibility" of not less than 75%.

13. A method according to claim 10 in which the "protective agent" is dextrin.

14. A method according to claim 12 in which the "protective agent" is dextrin.

MOSES L. CROSSLEY.
ROY H. KIENLE.
GEORGE L. ROYER.